United States Patent [19]

Kumar

[11] Patent Number: 4,695,941
[45] Date of Patent: Sep. 22, 1987

[54] LOSS OF ELECTRICAL FEEDBACK DETECTOR

[75] Inventor: Ajith K. Kumar, Erie, Pa.

[73] Assignee: General Electric Company, Erie, Pa.

[21] Appl. No.: 760,204

[22] Filed: Jul. 29, 1985

[51] Int. Cl.⁴ ............................................. G05B 13/02
[52] U.S. Cl. ..................................... 364/165; 364/176; 364/184; 364/431.11; 318/565
[58] Field of Search ............ 364/165, 184, 176, 434.11; 318/563, 565

[56] References Cited

U.S. PATENT DOCUMENTS

| | | | |
|---|---|---|---|
| 3,979,682 | 9/1976 | Warwick | 364/176 |
| 4,276,502 | 6/1981 | Elliott | 318/565 |
| 4,339,801 | 7/1982 | Hosaka et al. | 364/431.04 |
| 4,374,423 | 2/1983 | Kundler et al. | 318/563 |
| 4,410,938 | 10/1983 | Higashiyama | 364/200 |
| 4,479,177 | 10/1984 | Berti | 364/184 |
| 4,503,479 | 3/1985 | Otsuka et al. | 364/431.11 |
| 4,509,110 | 4/1985 | Levesque et al. | 318/563 |
| 4,510,565 | 4/1985 | Dummermuth | 364/174 |
| 4,578,747 | 3/1986 | Hideg et al. | 364/165 |
| 4,587,615 | 5/1986 | Takahashi | 364/431.11 |

Primary Examiner—Jerry Smith
Assistant Examiner—John R. Lastova
Attorney, Agent, or Firm—Albert S. Richardson, Jr.

[57] ABSTRACT

To detect any abnormal loss of a feedback signal in an electric power system wherein a plurality of feedback signals are respectively derived from various system quantities, such as voltage and current, and are used as inputs to a controller that regulates the output of a controllable source of power, the controller is arranged to estimate the desired value of the system quantity from which a first feedback signal is derived, to compare the estimated desired value with the actual value of the same quantity (as indicated by the first feedback signal), and to signal a malfunction if this comparison reveals that the first feedback signal is faulty.

17 Claims, 9 Drawing Figures

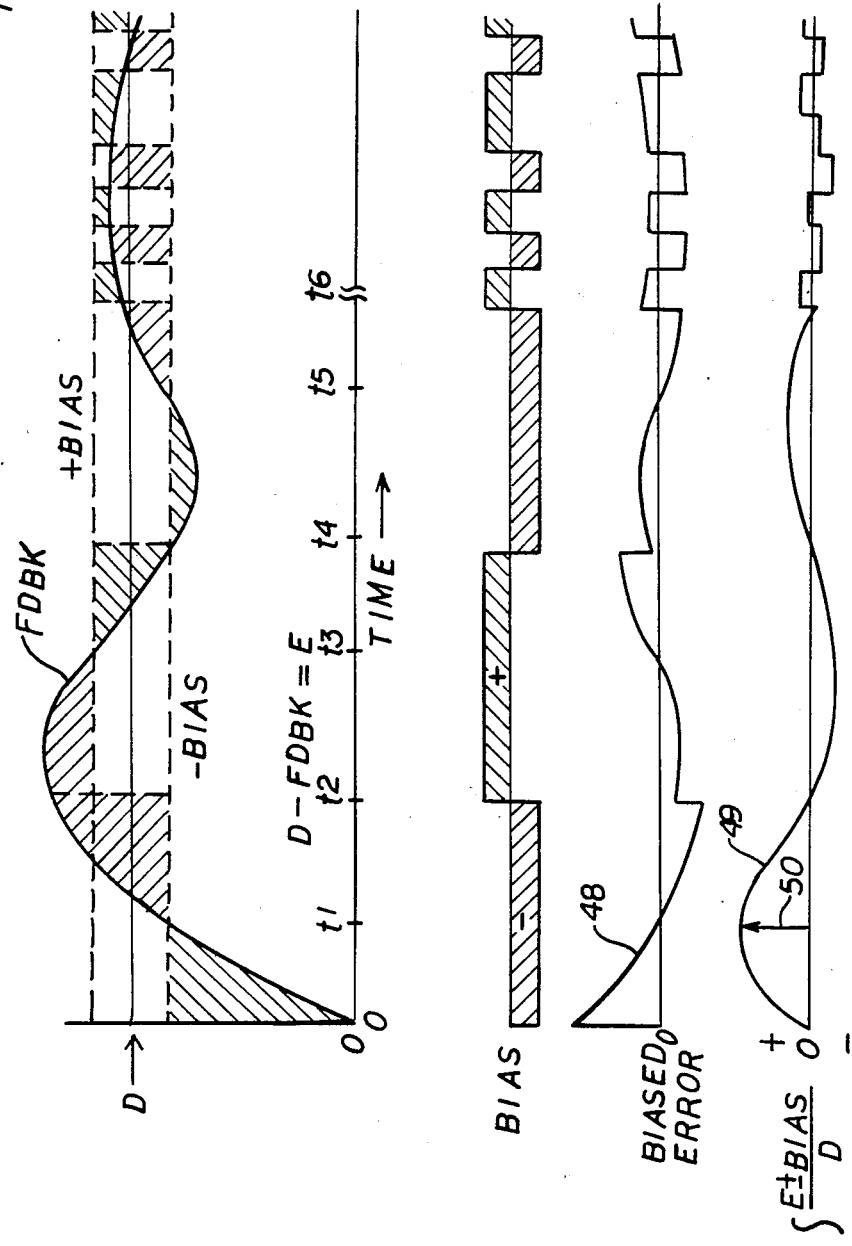

FEEDBACK LOSS
DETECTION
ROUTINE (V AND $I_{AV}$)

SUBROUTINE 1

ESTIMATE DESIRED
VALUE (D) OF V

ESTIMATE DESIRED VALUE (D) OF $I_{AV}$

LOSS OF ELECTRICAL FEEDBACK DETECTOR

BACKGROUND OF THE INVENTION

This invention relates generally to an electric power system in which a variable amount of electric power is supplied to an electric load circuit from a controllable source that is controlled by regulating means responsive to a given command signal and to a plurality of feedback signals representative, respectively, of various system parameters, and it relates more particularly to improved means for detecting any abnormal loss of feedback signals representative of certain vital system parameters.

The invention is described in the context of a controller for a large self-propelled traction vehicle, such as a locomotive wherein a thermal prime mover (typically a 16-cylinder turbocharged diesel engine) is used to drive an electrical transmission comprising generating means for supplying electric current to a plurality of direct current (d-c) traction motors whose rotors are drivingly coupled through speed-reducing gearing to the respective axle-wheel sets of the vehicle. The generating means typically comprises a main 3-phase traction alternator whose rotor is mechanically coupled to the output shaft of the engine. When excitation current is supplied to field windings on the rotating rotor, alternating voltages are generated in the 3-phase stator windings of the alternator. These voltages are rectified and applied to the armature windings of the traction motors.

During the "motoring" or propulsion mode of operation, a locomotive diesel engine tends to deliver constant power, depending on throttle setting and ambient conditions, regardless of locomotive speed. Historically, locomotive control systems have been designed so that the operator can select the desired level of traction power, in discrete steps between zero and maximum, and so that the engine develops whatever level of power the traction and auxiliary loads demand.

Engine horsepower is proportional to the product of the angular velocity at which the crankshaft turns and the torque opposing such motion. For the purpose of varying and regulating the amount of available power, it is common practice to equip a locomotive engine with a speed regulating governor which adjusts the quantity of pressurized diesel fuel (i.e., fuel oil) injected into each of the engine cylinders so that the actual speed (RPM) of the crankshaft corresponds to a desired speed. The desired speed is set, within permissible limits, by a manually operated lever or handle of a throttle that can be selectively moved in eight steps or "notches" between a low power position (N1) and a maximum power position (N8). The throttle handle is part of the control consol located in the operator's cab of the locomotive. The position of the throttle handle determines the engine speed setting of the governor.

For each of its eight different speed settings, the engine is capable of developing a corresponding constant amount of horsepower (assuming maximum output torque). When the throttle notch 8 is selected, maximum speed (e.g., 1,050 rpm) and maximum rated gross horsepower (e.g., 4,000) are realized. Under normal conditions the engine power at each notch equals the power demanded by the electric propulsion system which is supplied by the engine-driven main alternator plus power consumed by certain electrically and mechanically driven auxiliary equipments.

The output power (KVA) of the main alternator is proportional to the product of the rms magnitudes of generated voltage and load current. The voltage magnitude varies with the rotational speed of the engine, and it is also a function of the amount of current in the alternator armature and field windings, respectively. For the purpose of accurately controlling and regulating the power supplied to the electric load circuit, it is common practice to adjust the field strength of the traction alternator to compensate for load changes and to minimize the error between actual and desired KVA. The desired power demands on the specific speed setting of the engine. Such excitation control will establish a balanced steady-state condition which results in a substantially constant, optimum electrical power output for each position of the throttle handle.

The alternator output regulating function is performed by an associated controller which is responsive to the throttle position and to a plurality of feedback signals representative, respectively, of certain parameters or quantities (such as the magnitudes of the alternator output voltage and current) of the electric propulsion system. If, due to a fault in the voltage or current sensor or the like, a vital feedabck signal were lost, the regulator would malfunction. In this abnormal event, the regulator would cause the alternator to supply more than the desired KVA to the traction motors, a "wheel-slip" condition would develop, and the propulsion equipment could be damaged if the operator fails to move the throttle handle to a lower notch in fast enough response to the loss of wheel adhesion.

SUMMARY OF THE INVENTION

A general objective of the present invention is to provide improved means for automatically detecting the loss of an electric feedback signal.

A more specific objective is the provision, for an electric power system including means for regulating the amount of power supplied from a controllable source to an electric load circuit and means for deriving a plurality of feedback signals. representative of selected source and load parameters, of means responsive to a fault in the feedback signal deriving means for quickly and reliably signaling the loss of a feedback signal.

In carrying out the invention in one form, a variable amount of electric power is supplied to an electric load circuit from a suitable source of power which is controlled by regulating means responsive to a given command signal and to a plurality of feedback signals that are derived, respectively, from the output voltage and current of the source and from various other characteristic quantities of the source and the load. To detect the loss of a first one of the feedback signals, the desired value of the particular quantity represented by the first signal is periodically estimated. In one aspect of the invention, two other feedback signals and a known characteristic of the source or load are used to compute the estimated desired value of the aforesaid quantity. From the estimated desired value, the actual value of the aforesaid quantity, as indicated by the first feedback signal, is subtracted to find the difference therebtween, and a predetermined bias value is either added to or subtracted from the difference to provide a biased error value. The loss of feedback detector includes means for providing a resultant value representative of the time integral of the biased error value. Periodically the polarity of the resultant value is tested: if it is negative the bias value is added to the difference value, but if it is not negative the bias value is subtracted from the difference value. Periodically the magnitude of the resultant value is also tested: if it exceeds a predetermined threshold, which is true when there is an abnormal deviation between the estimated desired value of the aforesaid quantity and the actual value thereof as indicated by the first feedback signal, the loss of the first feedback signal is signaled.

The invention will be better understood and its various objects and advantages wil be more fully appreciated from the following description taken in conjunction with the accompanying drawings.

BRIEF DESCRIPTION OF THE DRAWINGS

FIG. 5 is a time chart of the value of a typical system quantity and other dependent variables to illustrate the operation of the feedback loss detecting function in the FIG. 4 diagram;

DESCRIPTION OF THE PREFERRED EMBODIMENT

Figure 1:
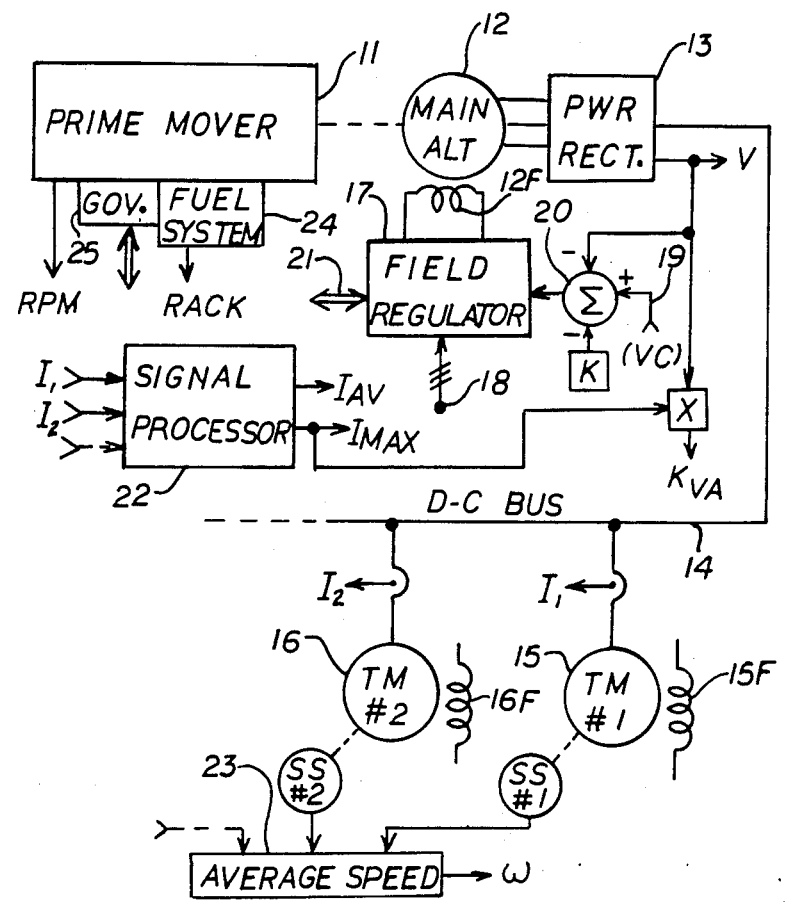
FIG. 1 is a schematic diagram of an electrical propulsion system for a traction vehicle, including a thermal prime mover (such as a diesel engine), a traction alternator, and a plurality of traction motors.

The propulsion system shown in FIG. 1 includes a variable-speed prime mover 11 mechanically coupled to the rotor of a dynamoelectric machine 12 comprising a 3-phase alternating current (a-c) synchronous generator, also referred to as the main traction alternator. The main alternator generates 3-phase voltages in its non-rotating armature windings, and these voltages are applied to a-c input terminals of at least one 3-phase, double-way uncontrolled power rectifier bridge 13. The rectified electric power output of the bridge 13 is supplied, via a d-c bus 14, to an electric load circuit comprising parallel-connected armature windings of a plurality of variable-speed d-c traction motors (TM), only two of which (15,16) are identified in FIG. 1. The described power components 11–16 are all located on board a self-propelled traction vehicle such as a locomotive. In practice each traction motor is hung on a different axle of the locomotive, and its shaft is coupled to the associated axle by speed-reduction gearing (not shown). There are usually two or three axles per truck, and there are two trucks per locomotive.

The traction motors have non-rotating field windings 15F and 16F that are respectively connected in series with the windings on their rotatable armatures during the motoring or propulsion mode of operation. However, for braking or retarding the locomotive the armature windings of the traction motors are disconnected from the power rectifier 13 and connected to a conventional dynamic braking resistor grid (not shown), and the motor field windings are reconnected in series with each other for energization by the rectified output of the main alternator 12. (Alternatively, a-c traction motors could be used, in which case suitably controlled electric power inverters would be connected between the respective motors and the d-c bus 14.)

Field windings 12F on the rotor of the main alternator 12 are connected for energization to the output of a suitable source 17 of regulated excitation current. Preferably the source 17 comprises a 3-phase controlled rectifier bridge the input terminals 18 of which receive alternating voltages from a prime mover-driven auxiliary alternator that can actually comprise an auxiliary set of 3-phase armature windings on the same frame as the main alternator 12. This source includes conventional means for varying the magnitude of the direct current that it supplies to the alternator field as necessary to minimize any magnitude difference between a variable control signal on an input line 19 and a feedback signal V representative of the average magnitude of the output voltage of the power rectifier 13. The latter voltage magnitude is a known function of the magnitude of excitation current in the field windings 12F and of the magnitude of output current in the armature windings of the main alternator 12, respectively, and it also varies with the speed of the prime mover 11. It is sensed by a conventional voltage sensing module connected across the d-c output terminals of the power rectifier The field regulator 17 responds to a difference or error signal from a summing point 20 where the magnitude of the voltage feedback signal V is subtracted from the excitation control signal (VC) on line 19. As is indicated in FIG. 1, a constant magnitude K is also subtracted from the control signal, and consequently the control signal has a finite but relatively low level when no output voltage is desired. In the regulator 17 there is suitable means for preventing the alternator field current from exceeding a predetermined safe maximum limit regardless of the difference between actual and desired magnitudes of the rectified alternator output voltage. The alternator field regulator communicates with a main controller (FIGS. 2 and 3) via a multiline serial data link or bus 21.

Conventional current sensors are connected between the d-c bus 14 and the respective traction motors 15, 16 to provide current feedback signals 11, 12, etc. that are representative, respectively, of the magnitude of current in the individual motor armature windings during motoring. These signals are supplied as inputs to a signal processor 22 which has two output values: IMAX and IAV. The processor 22 is so constructed and arranged that the value of IMAX is determined by the input signal of highest magnitude, whereas IAV has a value corresponding to the average magnitude of all of the individually sensed currents.

The value of the maximum current feedback signal IMAX is multiplied by the value of the voltage feedback signal V in a multiplying function (illustrated in FIG. 1 as a block labeled "X") to provide a measure, designated KVA, of the kilowatts of electric power used by the most loaded traction motor. Suitable speed sensors (SS) associated with the respective traction motors measure the angular velocity or speed (revolutions per minute) of the shaft of each motor, and the average speed $\omega$ of all of the motors is derived from the speed sensor outputs by an averaging function 23.

The prime mover 11 that drives the alternator field 12F is a thermal or internal-combustion engine or equivalent. On a diesel-electric locomotive, the motive power is typically provided by a high-horsepower, turbocharged, 4-stroke, 16-cylinder diesel engine. Such an engine has a number of ancillary systems, some of which are represented by labeled block in FIG. 1. A diesel engine fuel system 24 conventionally includes a fuel tank, fuel pumps and nozzles for injecting fuel oil into the respective power cylinders which are arranged in two rows or banks on opposite sides of the engine, tappet rods cooperating with fuel cams on a pair of camshafts for actuating the respective injectors at the proper times during each full turn of the crankshaft, and a pair of fuel pump racks for controlling how much fuel oil flows into a cylinder each time the associated injector is actuated. The position of each fuel pump rack, and hence the quantity of fuel that is being supplied to the engine, is controlled by an output piston of an engine speed governor system 25 to which both racks are linked. The governor regulates engine speed by automatically displacing the racks, within predetermined limits, in a direction and by an amount that minimizes any difference between actual and desired speeds of the engine crankshaft. The desired speed is set by a variable speed control signal which is herein called the speed command signal or the speed call signal. An engine speed signal RPM indicates the actual rotational speed of the engine crankshaft and hence of the alternator field.

Figure 2:
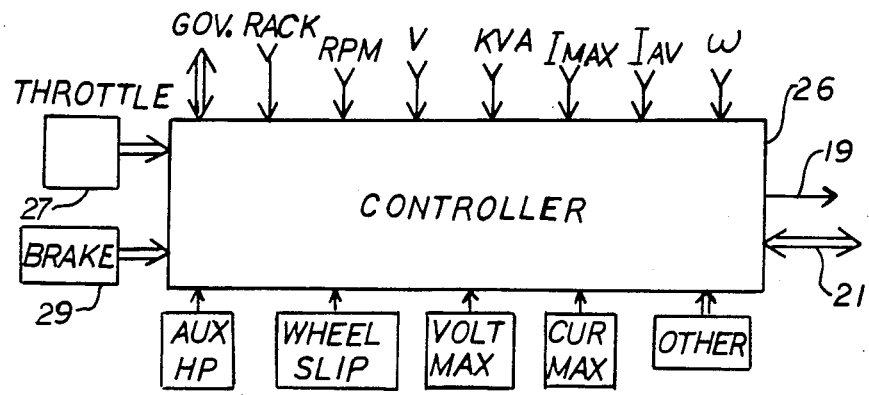
FIG. 2 is a block diagram of a controller that controls the alternator field regulator shown in FIG. 1.
Figure 3:
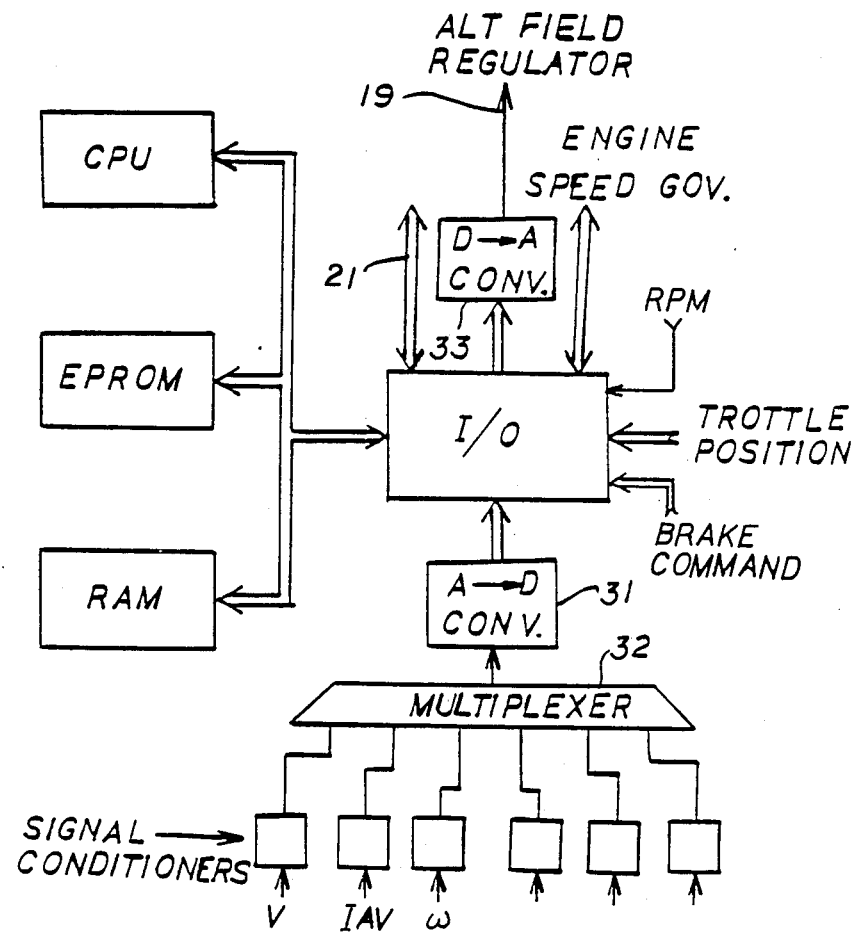
FIG. 3 is an expanded block diagram of the presently preferred embodiment of the controller which produces output signals for controlling the field excitation of the alternator and the rotational speed of the engine.

The speed command signal for the engine governor system and the excitation control signal for the alternator field regulator are provided by an associated controller 26 which is illustrated in FIGS. 2 and 3. In a normal motoring or propulsion mode of operation, the values of these signals are determined by the value of a command signal that is given to the controller by a manually operated throttle 27 to which the controller is coupled. A locomotive throttle conventionally has eight power positions or notches (N), plus idle and shutdown. N1 corresponds to a minimum desired engine speed (power), while N8 corresponds to maximum speed and full power. When dynamic braking of a moving locomotive is desired, the operator moves the throttle handle to its idle position and manipulates a manually operated lever of a conventional brake controller 29 so that the main controller 26 is now supplied with a variable brake command signal that will determine the value of the alternator excitation control signal. In a consist of two or more locomotives, only the lead unit is usually attended, and the main controller on board each trail unit will receive, over trainlines, encoded signals that indicate the throttle position or brake command selected by the operator in the lead unit.

For each power level of the engine there is a corresponding desired load. The controller 26 is suitably arranged to translate the notch information from the throttle 27 into a control signal of appropriate magnitude on the input line 19 of the alternator field regulator 17, whereby in motoring the traction power is regulated to match the called-for power so long as the alternator output voltage and load current are both within predetermined limits. For this purpose, and for the purpose of deration (i.e., unloading the engine) in the event of certain abnormal conditions, it is necessary to supply the controller 26 with information about various operating conditions and quantities (i.e., properties or parameters) of the propulsion system.

More particularly, the controller 26 typically receives the above-mentioned engine speed signal RPM and the voltage feedback signal V, and it is responsive to the average motor speed $\omega$, the maximum and average current values indicated by IMAX and IAV, respectively, and the actual power value indicated by KVA. While IMAX, IAV, KVA and $\omega$ are illustrated in FIGS. 2 and 3 as separate input signals to the controller, in practice the signal processors 22 and 23 and the multiplying function X (see FIG. 1) are preferably incorporated in the controller which is suitably arranged to derive these values from the externally supplied current (11, 12, etc.), voltage (V), and motor speed feedback signals, respectively.

The controller 26 also receives a load control signal issued by the governor system 25 if the engine cannot develop the power demanded and still maintain the called-for speed. (The load control signal is effective, when issued, to reduce the magnitude of the control signal on the line 19 so as to weaken the alternator field until a new balance point is reached.) As is illustrated in FIG. 2, the controller is supplied with additional data including: "RACK" datum, derived from the engine governor or fuel system, to indicate the displacement of the fuel pump rack; "AUX HP" datum, derived from controls of auxiliary load equipment (not shown) associated with the locomotive, to indicate the amount of power per axle that the auxiliary loads of the locomotive are actually using; "WHEEL SLIP" data indicating that either a small or a moderate reduction of traction power is required to correct a wheelslip condition and thus restore wheel-rail adhesion; "VOLT MAX" and "CUR MAX" data that establish absolute maximum limits for the alternator output voltage and current, respectively; and relevant data from other selected sources, as represented in FIG. 2 by the block label "OTHER."

In the presently preferred embodiment of the invention, the controller 26 comprises a microcomputer. Persons skilled in the art will understand that a microcomputer is actually a coordinated system of commercially available components and associated electrical circuits and elements that can be programmed to perform a variety of desired functions. In a typical microcomputer, which is illustrated in FIG. 3, a central processing unit (CPU) executes an operating program stored in an erasable and electrically reprogrammable read only memory (EPROM) which also stores tables and data utilized in the program. Contained within the CPU are conventional counters, registers, accumulators, flip flops (flags), etc., along with a precision oscillator which provides a high-frequency clock signal. The microcomputer also includes a random access memory (RAM) into which data may be temporarily stored and from which data may be read at various address locations determined by the program stored in the EPROM. These components are interconnected by appropriate address, data, and control buses. In one practical embodiment of the invention, an Intel 8086 microprocessor is used.

The other blocks shown in FIG. 3 represent conventional peripheral and interface components that interconnect the microcomputer and the external circuits. More particularly, the block labeled "I/O" is an input- /output circuit for supplying the microcomputer with data representative of the selected throttle position or the brake command and with digital signals representative of the readings of various voltage, current, motor speed, and other feedback sensing modules associated with the locomotive propulsion system. The latter signals are derived from an analog-to-digital converter 31 connected via a conventional multiplexer 32 to a plurality of signal conditioners to which the sensor outputs are respectively applied. The signal conditioners serve the conventional dual purposes of buffering and biasing the analog sensor output signals. As is indicated in FIG. 3, the input/output circuit also interconnects the microcomputer with the alternator field regulator via the multiline bus 21, with the engine speed governor, with the engine speed sensor, and with a digital-to-analog signal converter 33 whose output is connected to the line 19.

The controller 26 is programmed to produce, on the line 19, a control signal having a magnitude that depends on either the throttle position selected by the locomotive operator (in the normal monitoring mode of operation) or the brake command selected by the operator (in the dynamic braking mode). The presently preferred manner in which this is accomplished during motoring is described in a copending U.S. patent application Ser. No. 747,628 filed on June 24, 1985, in the joint names of E. T. Balch, R. E. Bilski and A. K. Kumar and assigned to General Electric Company, which patent application is incorporated herein by reference.

As is explained in the referenced application, the alternator excitation control programs (reference No. 41 in Fig. 4) include routines for providing three separate throttle position-dependent limited values that determine the desired values (on a per axle basis) of alternator output voltage, current and power, respectively. The desired values are respectively compared with the actual values of the corresponding system quantities (i.e., the values indicated by V, IMAX, and KVA) to derive three error values representative of the differences, if any, between the respective pairs of values that are so compared. The three error values are then processed in accordance with programmed compensation routines to derive voltage, current and power control values that are respectively representative of the voltage, current and power error values. The compensation routines introduce proportional plus integral transfer functions (see reference No. 42 in FIG. 4), the respective gains of which are determined by data that depend on the throttle position and other parameters of the locomotive and its controls. Thus each control value varies as a function of the time integral of its associated error value. All three of the control values are supplied to a gate 43 that selects the least value for passing to a limit function 44 from which an output signal VC is derived, and accordingly the value of VC corresponds to the smallest control value.

The value of VC determines the magnitude of the analog control signal that the controller 26 supplies, via the line 19, to the alternator field regulator 17 (FIG. 1). The field regulator will respond to the latter signal by varying the field strength of the traction alternator as necessary to minimize any difference between the value of the voltage feedback signal V and the value of the output signal VC. So long as both V and IMAX are within a limit that varies with the throttle position and are not above their respective maximum limits as established by VOLT MAX and CUR MAX, the value of VC is determined by the power control value which will now be smaller than either the voltage or current control value. Consequently the alternator output voltage is maintained at whatever level results in essentially zero error between actual and desired traction power. But if V (or IMAX) tends to exceed its limited reference value, the voltage (or current) control value is driven lower than the power control value and the value of VC accordingly decreases, whereby the alternator voltage is adjusted to whatever level results in zero voltage (or current) error.

Occasionally a malfunction or fault can develop in a voltage or current sensor or in the circuit that connects such a sensor to the main controller 26, whereby the voltage or current feedback signal is lost. In this abnormal event, there is a likelihood that the measured value (KVA) of traction power will be appreciably less than the actual power demand of the most loaded traction motor. To avoid damage, it is therefore desirable to respond to a loss of a voltage or current feedback signal by either reducing (derating) the traction load or shutting down the propulsion system, and the controller 26 is suitably programmed to accomplish this result.

Figure 4:
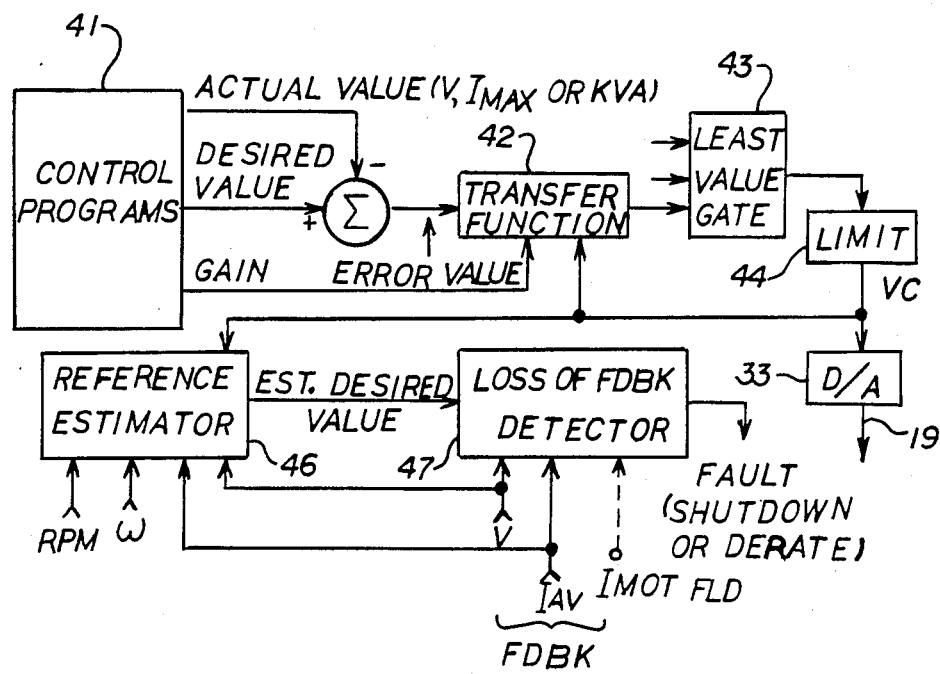
FIG. 4 is a diagram of an "equivalent circuit" that illustrates the loss of feedback detecting function performed by the controller shown in FIGS. 2 and 3.

In accordance with the present invention, the loss of a feedback signal is detected automatically by first estimating the desired value of the system quantity that the feedback signal represents and then comparing the desired value with the actual value of the same quantity as indicated by that feedback signal. In FIG. 4 these two steps or functions are symbolized, respectively, by a block 46 labeled "Reference Estimator" and by a block 47 labeled "Loss of FDBK Detector." Before closing more details of these estimating and comparing functions 46 and 47, the operation of the latter function will be explained with the aid of FIG. 5.

In FIG. 5 the horizontal trace D depicts a steady-state desired value of a predetermined variable quantity that is represented by a first feedback signal, as periodically estimated or predicted by the function 46. The undulating trace FDBK depicts the actual value of the same quantity, as indicated by the first feedback signal, from a time when traction load is initially applied. The difference (E) between these two values is found by subtracting FDBK from D, and, in a manner soon to be explained, E is algebraically combined with either a positive bias value or a negative bias value. Preferably both of the bias values have the same predetermined constant magnitude (BIAS). The resulting biased error value is depicted in FIG. 5 by trace 48. The biased error value (E±BIAS) is integrated to provide a resultant value (trace 49) which deviates from a predetermined initial value (e.g., 0) at a rate of change and in a direction that respectively depend on the magnitude and the polarity of the biased error value. In other words, the resultant value 49 is representative of the time integral of the biased error value. Preferably, prior to this integrating process the biased error value is normalized by dividing it by the estimated desired value (D), and it is the ratio of these two values that is integrated. Periodically the relative polarity of the integral 49 is tested. If the polarity is negative with respect to the initial value, BIAS is added to the aforesaid difference value (E), whereas if the polarity is positive with respect to the initial value, BIAS is subtracted from E.

For the conditionsn assumed in FIG. 5, the actual value (FDBK) of the predetermined system quantity rises from zero, at time 0, to the level of D−BIAS, at time t1, and then continues rising to and beyond the level of D before being corrected by the regulator. The biased error value 48 is initially positive, as is the integral 49. At time t1 the biased error value has declined to 0 and the integral 49 attains a peak magnitude 50. Thereafter the biased error is negative, and the integral 49 decays in magnitude until its polarity changes from positive to negative. As soon as the latter change is detected, at time t2, the bias value is caused to be added to E rather than subtracted from E. Now the integral 49 increases in magnitude in a negative direction but at a reduced rate until reaching a smaller peak magnitude at time t3 which coincides with the biased error value changing from negative to positive polarity. Later the integral 49 will change polarity from negative to positive, and as a result the bias value is again caused to be subtracted from E, at time t4.

As the propulsion system approaches a steady state condition, the undulations of the predetermined quantity decrease in amplitude and the actual value of this quantity closely approaches its desired value. In FIG. 5 the time scale is expanded after time t6 to illustrate more realistically the steady state operation of the comparison function 47. If FDBK reaches a constant value that precisely equals D, the magnitude of the biased error value 48 will remain equal to BIAS, its polarity will change every time the polarity of the integral 49 is tested, and consequently the magnitude of the integral will average zero. The bias magnitude is selected to match the maximum permissible inaccuracy or error in the feedback sensing module, at rated output, due to unavoidable signal offsets and gain tolerances. So long as the steady-state value of FDBK does not deviate from the actual value of the predetermined system quantity by more than this maximum permissible amount, the integral 49 will have a constant average magnitude proportional to not more than twice the ratio of BIAS to D.

In the abnormal event of a feedback loss due to a fault in the feedback sensing module, the biased error value 48 will not behave as shown in FIG. 5 but will instead have a continuously positive polarity, and consequently the integral 49 will progressively increase in magnitude. The comparison function 47 includes level detecting means for signaling the loss of the first feedback signal if the absolute magnitude of the integral 49 exceeds a predetermined threshold which is higher than the highest peak magnitude 50 that is expected during usual transient responses of the system to changes in the throttle position.

Figure 6:
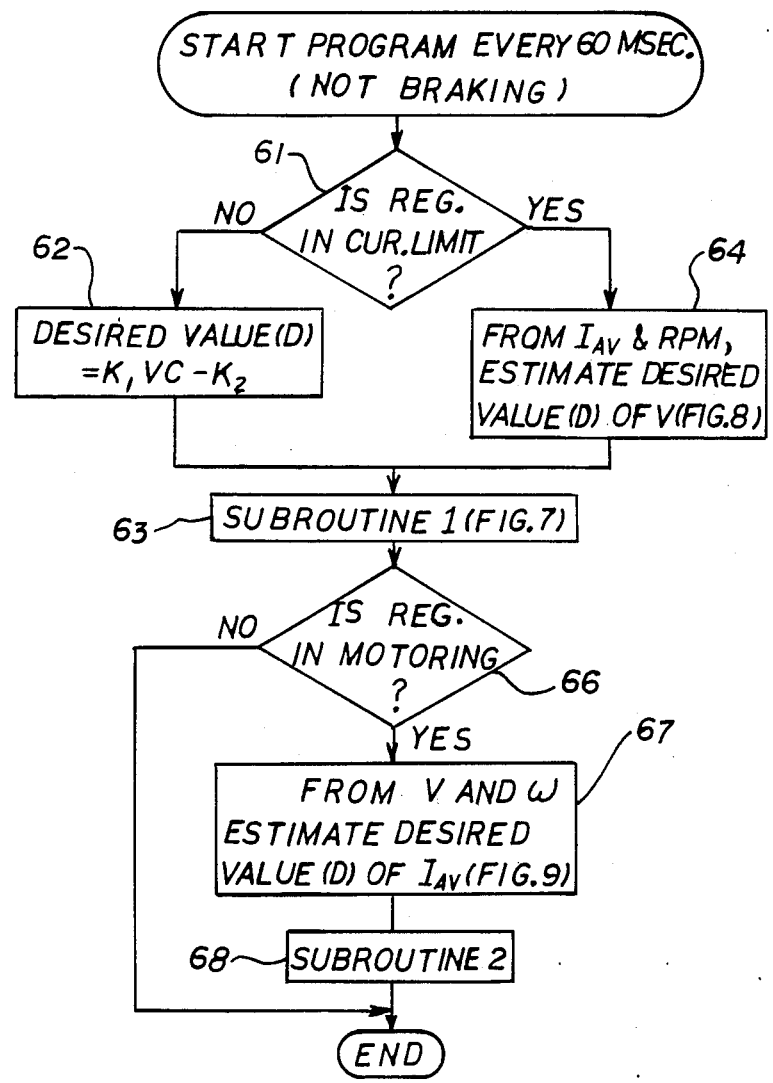
FIGS. 6 and 7 are flow charts that explain the preferred manner of detecting the loss of either the voltage feedback signal or a motoring current feedback signal in accordance wtih the present invention.

Although the feedback loss detecting function could be implemented in a variety of different ways to obtain the results shown in FIG. 5, the presently preferred way is to program the microcomputer 26 to execute the routine that is illustrated in FIG. 6. The program is started every 60 milliseconds to determine automatically whether or not there has been a loss of either the voltage feedback signal V or the average current feedback signal IAV. The FIG. 6 program is executed only when the propulsion system is not operating in a dynamic braking mode. It starts at an inquiry point 61 which determines whether or not the alternator field regulator 17 (FIG. 1) is in its field current limiting mode. If the answer is negative (which indicates that the regulator is behaving normally to vary the alternator output voltage as an essentially linear function of the magnitude of the excitation control signal), the next step 62 in the FIG. 6 program is to estimate the desired value (D) of output voltage by reading the value of VC and solving the following equation for D:

$$D = K_1 VC - K_2.$$

Figure 7:
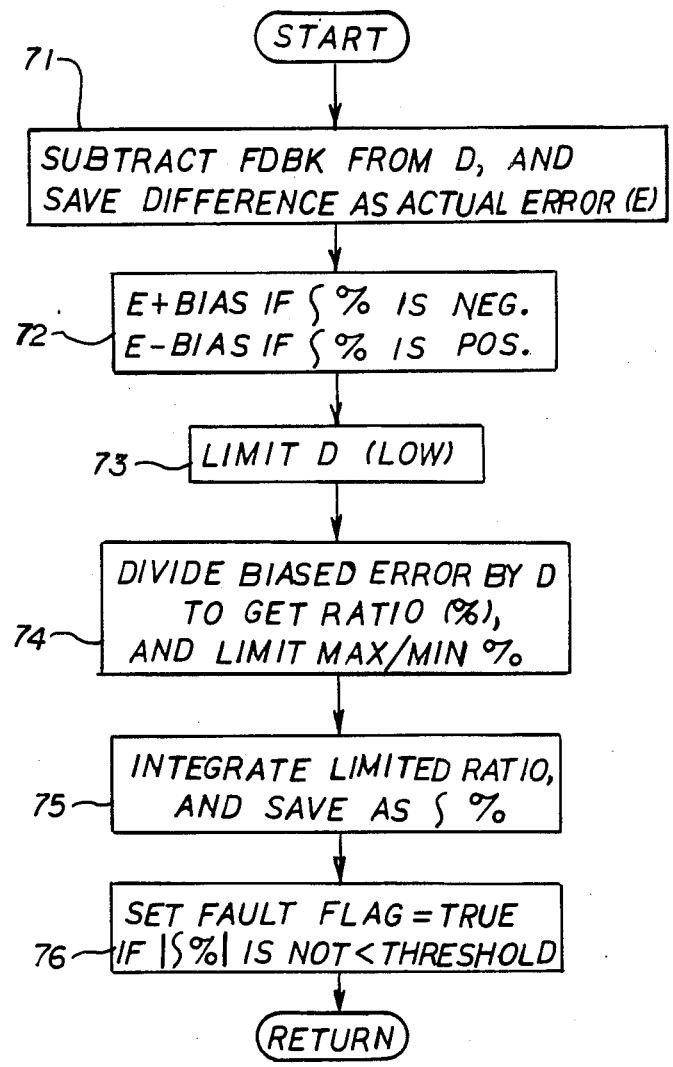

In this equation, the value of VC corresponds to the magnitude of the excitation control signal on the line 19, $K_1$ is a predetermined scaling factor (i.e., proportionality constant), and $K_2$ is a predetermined constant corresponding to the magnitude K that is subtacted from the control signal at the summing point 20 (FIG. 1). Thus D varies with the value of the excitation control signal produced by the controller 26. From step 62 the program proceeds to a step 63 where a Subroutine 1 is executed. The subroutine 1, which implements the comparison function 47 (FIG. 4) for the voltage feedback signal V, is shown in FIG. 7 and will soon be described.

Alternatively, if the answer to the initial inquiry 61 were affirmative (which indicates that maximum excitation current is flowing in the alternator field 12F and V will not track VC), the next step 64 in the FIG. 6 program would be to find D by executing the subroutine illustrated in FIG. 8 which will now be described. The first step 81 in the FIG. 8 subroutine is to read the value of the average current feedback signal IAV and to multiply it by the number of powered axles so that the resulting product (IALT) equals the magnitude (amperes) of the output current of the traction alternator 12 (FIG. 1). In the next step 82 of this subroutine, the known E/RPM vs. IALT characteristic 83 of a typical traction alternator is utilized to find the magnitude of E/RPM that approximately corresponds to IALT. The referenced characteristic 83, in which E is the magnitude (volts) of the rectified alternator output voltage and RPM is the rotational speed (revolutions per minute) of the alternator, is determined at maximum alternator field strength (i.e., when the magnitude of field current equals the above-mentioned predetermined maximum limit), and it is stored in the memory of the microcomputer in the form of a look-up table. Upon completing step 82 the subroutine proceeds to a step 84 where the magnitude of the engine speed feedback signal RPM is read, multiplied by E/RPM, and scaled to calculate a value (ESTREF) proportional to the product of the speed and the E/RPM magnitude of the traction alternator.

Figure 8:
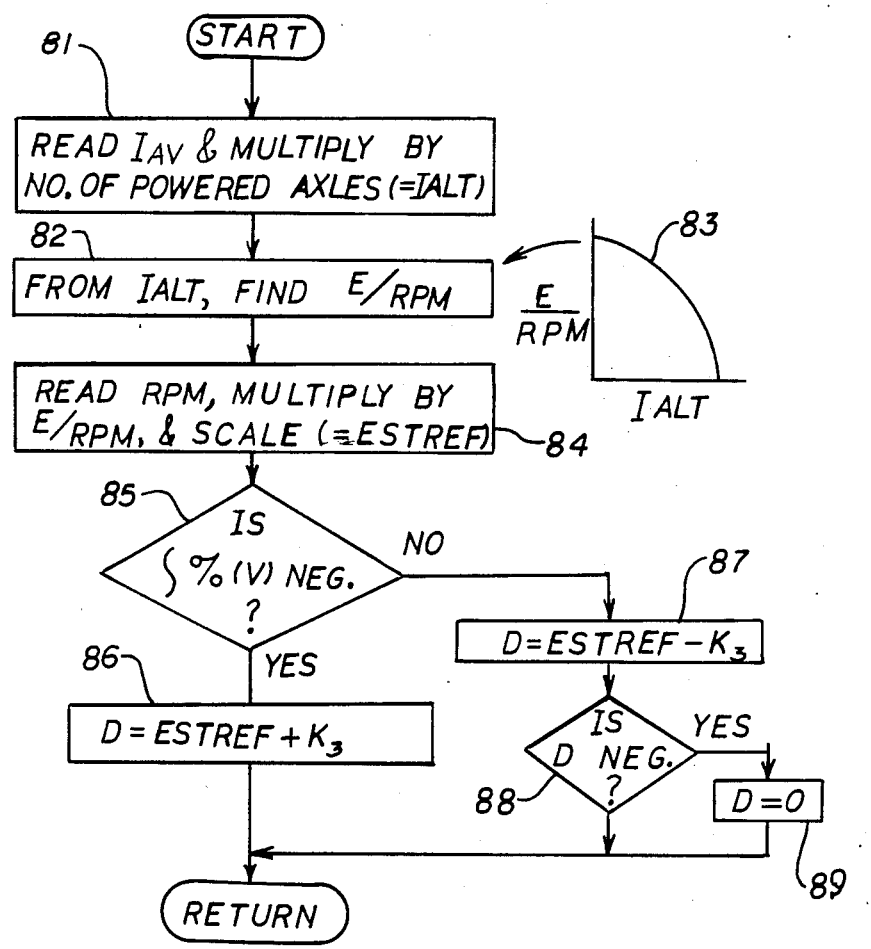
FIGS. 8 and 9 are flow charts that explain the operation of the preferred embodiments of the subroutines shown in FIG. 6 as single steps for estimating the desired values of voltage and motoring current, respectively.

The FIG. 8 subroutine proceeds from step 84 to a step 85 which tests whether or not the polarity of the integrated biased error for the voltage feedback signal is negative. If the polarity is negative, a predetermined constant $K_3$ is added to the magnitude of ESTREF in a step 86, and their sum is saved as D. Otherwise, $K_3$ is subtracted from ESTREF in a step 87 which is followed by an inquiry 88 to determine whether or not the difference is negative. If not, D equals ESTREF minus $K_3$; otherwise D is made equal to 0 in a step 89. The magnitude of the constant $K_3$ is selected to match the maximum expected variations of the actual E/RPM vs. IALT characteristics among different traction alternators, compared to the typical characteristic 83 that is stored in the memory of the microcomputer. So long as the steady-state value of ESTREF does not deviate from the actual value of the alternator output voltage by more than this maximum amount and there is no malfunction in the voltage feedback sensing module, the integrated biased error for the voltage feedback signal will have a constant average magnitude well below the above-mentioned predetermined threshold level.

Having executed either step 62 or step 64 to estimate the desired value of the alternator output voltage, the FIG. 6 program proceeds to execute Subroutine 1 (FIG. 7) which will now be described. The first step 71 of this subroutine is to find the actual value (FDBK) of the alternator output voltage by reading the voltage feedback signal V, to subtract it from the estimated desired value (D), and to save the difference as an actual error value (E). Normally E should agree with the value of the error signal from the summing point 20 associated with the alternator field regulator 17 (FIG. 1), but the latter signal is not available in the controller 26. Step 71 is followed by a step 72 wherein the polarity of the integrated biased error (i.e., the integrated ratio of E±BIAS to D, as saved at step 75 during the preceding pass through this subroutine) is detected, and the aforesaid constant bias value (BIAS in FIG. 5) is added to E if the polarity is negative or subtracted from E if the polarity is not negative. It will be apparent that step 72 provides the above-mentioned biased error value (E±BIAS).

Preferably, as is shown in FIG. 7, Subroutine 1 includes a step 73 in which D is made equal to a predetermined low limit if it does not otherwise have a higher value. This low limit avoids undesirable errors in the next step 74 when D is nearly zero. In step 74, the biased error value is normalized by dividing E±BIAS by the estimated desired value D to calculate the ratio (%) of these two quantities. This step also introduces both maximum and minimum limits to the magnitude of the calculated ratio. The subroutine proceeds from step 74 to a step 75 which integrates the limited ratio and saves the integral or resultant value. Preferably, as is illustrated in FIG. 5 by the trace 49 after time t6, this integration is carried out in a step-wise manner simply by increasing (if the ratio is positive) or decreasing (if the ratio is negative) the previously saved value by an amount equal to the product of 60 ms and the present magnitude of the ratio. In the final step 76 of the FIG. 7 subroutine, the level or absolute magnitude of the integrated ratio is compared with the above-mentioned predetermined threshold level: if it is not lower than this threshold, a fault flag is set equal to "true," thereby signaling the loss of the voltage feedback signal V.

Figure 9:
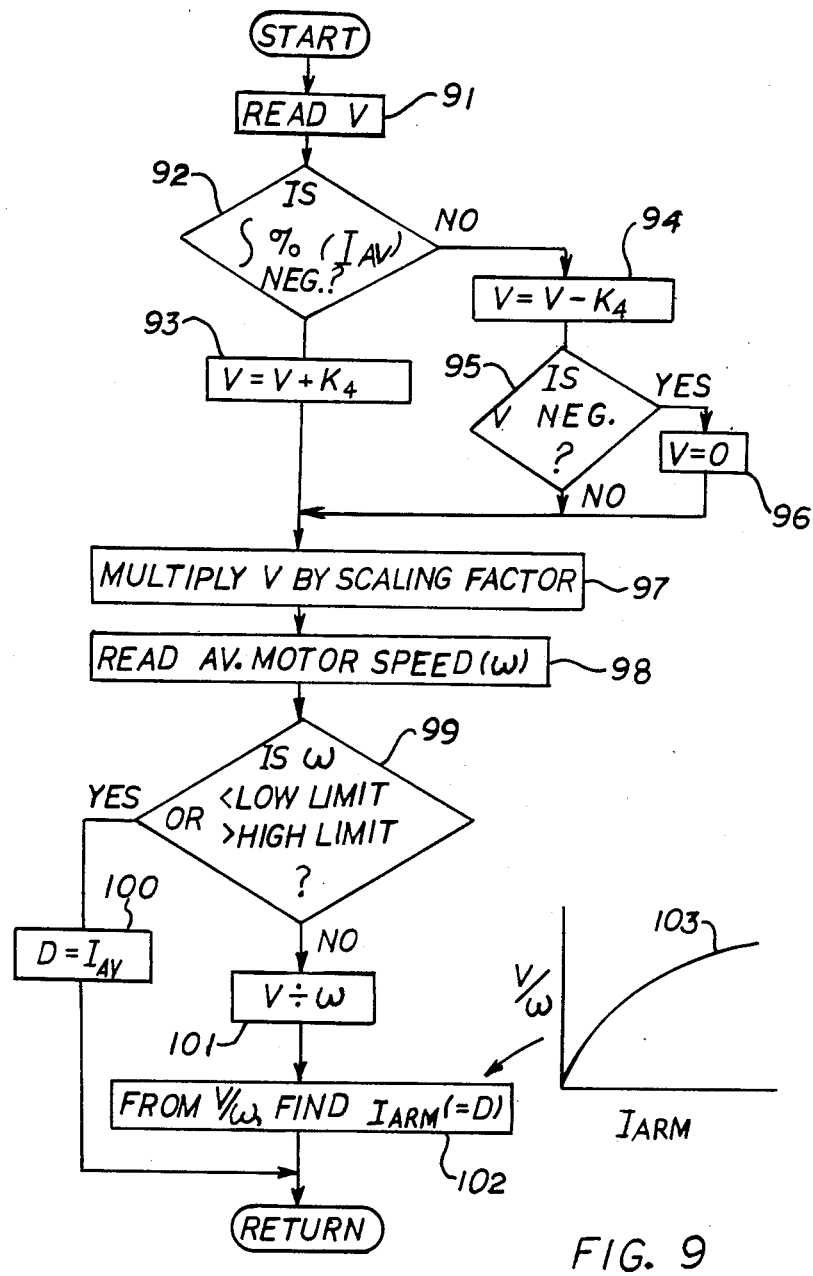

On returning from the Subroutine 1, the FIG. 6 program resumes at an inquiry point 66 which determines whether or not the propulsion system is operating in its motoring mode. If not, the program ends here. But if the system is in motoring, the program proceeds from point 66 to a step 67 where the desired value (D) of the average motor current is estimated. The preferred embodiment of step 67 is illustrated in FIG. 9 which will now be described. The FIG. 9 subroutine begins with a step 91 of reading the voltage feedback signal V, and it then proceeds to a step 92 which tests whether or not the polarity of the integrated biased error for the current feedback signal is negative. If the polarity is negative, the subroutine proceeds to a step 93 which modifies V by adding a predetermined constant $K_4$. Otherwise, V is modified by subtracting $K_4$ in a step 94 which is followed by an inquiry 95 to determine whether or not the modified V is negative. If not, V remains equal to the original V minus $K_4$; otherwise V is made equal to 0 in a step 96. Then, in a step 97, the modified value of V is multiplied by a suitable caling factor to derive a further modified value of V.

The next step 98 of the FIG. 9 subroutine is to read the average motor speed (revolutions per minute) as indicated by the feedback signal $\omega$. Step 98 is followed by an inquiry 99 to determine if this speed is less than a predetermined low limit or more than a predetermined high limit. If the answer is affirmative, the FIG. 9 subroutine is aborted via a step 100 which sets D equal to the actual value of average motor current as indicated by the current feedback signal IAV. Alternatively, if the answer to the inquiry 99 were negative, the subroutine proceeds to a step 101 which calculates the quotient of the modified value of V divided by $\omega$.

In the next step 102, the known V/$\omega$ vs. IARM (armature amperes) characteristic 103 of a typical traction motor (which characteristic is stored in the memory of the microcomputer in the form of a look-up table) is utilized to find the magnitude of IARM that approximately corresponds to the quotient V/$\omega$ provided by the step 101. The magnitude of IARM that is found in this fashion is the estimated desired value D of the average motor current.

Having executed step 67 to estimate the desired value of the average motor current, the FIG. 6 program proceeds to execute a Subroutine 2 which is the same as subroutine 1 (FIG. 7) except for the magnitudes or levels of the constant bias value and the various limits. In Subroutine 2, FDBK is the actual value of the average motor current as indicated by the feedback signal IAV, D is the estimated desired value found by executing the step 67 (i.e., the subroutine shown in FIG. 9), and the fault flag, if "true," signals the loss of the current feedback signal.

The invention can also be used to detect the loss of the motor field current feedback signal when the propulsion system is operating in a dynamic braking mode. For this purpose, the main controller is programmed to execute, every 60 milliseconds in braking, a routine comprising steps similar to steps 62 and 63 of FIG. 6. When braking, the magnitude of the excitation control signal on the line 19 will vary as a function of the command signal from the brake controller 29 (FIG. 2). At the same time, a feedback signal which is representative of the magnitude of the current being supplied to the motor field windings from the rectified output of the traction alternator 12 will be subtracted from the control signal at the summing point 20 (FIG. 1) to determine the difference or error signal to which the field regulator 17 responds. Consequently, the estimated desired value (D) of traction motor field current varies with the magnitude of the excitation control signal (VC). In a subroutine similar to step 63 (FIG. 7), the actual value (FDBK) of the motor field current, as indicated by a feedback signal from a current sensor in series with the motor field windings 15F, 16F, etc., is subtracted from D to find the actual error value E.

While a preferred embodiment of the invention has been shown and described by way of example, many modifications will undoubtedly occur to persons skilled in the art. For example, the principles of the invention can be adapted to detect the loss of feedback signals that are representative of system quantities other than voltage and current. The concluding claims are therefore intended to cover all such modifications as fall within the true spirit and scope of the invention.

I claim:

1. In a controller for a system which includes means for supplying a controllable amount of electric power to an electric load circuit, means for deriving at least first, second and third feedback signals that are representative, respectively, of certain system quantities, and means associated with the power supplying means for varying the amount of power supplied to the load circuit as a function of the value of a variable control signal produced by the controller in selective response to the feedback signals and to a given command signal, improved means for detecting the loss of a feedback signal, comprising:

a. first means for periodically estimating the desired value of a predetermined system quantity that is represented by the first feedback signal;

b. second means associated with said first means and responsive to said first feedback signal for finding the difference between the estimated desired value of said predetermined quantity and the actual value thereof as indicated by said first feedback signal;

c. third means for providing a biased error value equal to said difference value plus or minus a predetermined bias value;

d. integrating means associated with said third means for providing a resultant value that is representative of the time integral of said biased error value;

e. polarity detecting means associated with both said third means and said integrating means for periodically causing said bias value to be added to said difference value if the polarity of said resultant value is negative and for periodically causing said bais value to be subtracted from said difference value if the polarity of said resultant value is positive; and f. level detecting means responsive to said resultant value for signaling the loss of said first feedback signal if the magnitude of said resultant value exceeds a predetermined threshold.

2. The feedback loss detecting means as in claim 1, in which a fourth means is associated with said first and third means for calculating the ratio of said biased error value to said estimated desired value and in which said integrating means is responsive to said ratio, whereby said resultant value depends on the time integral of said ratio.

3. The feedback loss detecting means as in claim 2, in which said fourth means comprises means for dividing said biased error value by the higher of either said estimated desired value or a predetermined low limit.

4. The feedback loss detecting means of claim 1 for a system wherein the value of the control signal determines the desired magnitude of a predetermined output quantity of the power supplying means and wherein the power varying means is effective to regulate said output quantity in a manner that will minimize any difference between actual and desired magnitudes thereof.

5. The feedback loss detecting means of claim 4 for a system wherein the first feedback signal is representative of said predetermined output quantity, in which said first means is responsive to said control signal and provides a desired value that varies with the value of the control signal.

6. The feedback loss detecting means as in claim 5, in which said estimated desired value equals a first value minus a predetermined constant, said first value being proportional to the control signal value.

7. The feedback loss detecting means of claim 5 wherein said predetermined output quantity is voltage.

8. The feedback loss detecting means of claim 1 for a system wherein the first feedback signal is representative of a first predetermined output quantity of the power supplying means, in which said first means is responsive to the second and third feedback signals and operates periodically to compute the desired value of said first predetermined output quantity.

9. The feedback loss detecting means of claim 8 for a system wherein the value of the control signal determines the desired magnitude of said first predetermined output quantity and wherein the power varying means is effective to regulate said first quantity in a manner that will minimize any difference between actual and desired magnitudes thereof.

10. The feedback loss detecting means of claim 8 for a system wherein the second feedback signal is representative of a second predetermined output quantity of the power supplying means, the value of the control signal determines the desired magnitude of said second quantity, and the power varying means is effective to regulate said second quantity in a manner that will minimize any difference between actual and desired magnitudes thereof.

11. The feedback loss detecting means of claim 8 for a system wherein the power supplying means comprises a dynamoelectric machine having a rotor that is driven at variable speed, said first predetermined output quantity is voltage, the second feedback signal is representative of the magnitude of output current of said machine, and the third feedback signal is representative of the speed of said machine.

12. The feedback loss detecting means of claim 11 for a system wherein said machine is an a-c generator having a rotating field excited by the power varying means, a non-rotating armature connected to the load circuit, and a known E/RPM vs. IALT characteristic when the generator field excitation current has a predetermined magnitude, where E is the magnitude (volts) of the generator output voltage, RPM is the rotational speed (revolutions per minute) of the generator, and IALT is the magnitude (amperes) of the generator output current, and in which said first means comprises (a1) means utilizing said known characteristic and the second feedback signal for periodically finding the magnitude of E/RPM that corresponds to the actual magnitude of output current, (a2) means responsive to the third feedback signal for calculating a first value proportional to the product of the generator speed and said E/RPM magnitude, and (a3) means responsive to said first value for deriving the estimated desired value of voltage.

13. The feedback loss detecting means as in claim 12, in which said estimated desired value equals said first value plus a predetermined constant if the polarity of said resultant value is negative, whereas said estimated desired value is equal to said first value minus said predetermined constant if the polarity of said resultant value is positive.

14. The feedback loss detecting means of claim 8 for a system wherein the load circuit comprises at least one electric motor having a shaft that rotates at variable speed, said first predetermined output quantity is current, the second feedback signal is representative of the magnitude of output voltage of the power supplying means, and the third feedback signal is representative of motor speed.

15. The feedback loss detecting means of claim 14 for a system wherein said motor is a d-c motor having a rotatable armature and a known V/$\omega$ vs. IARM characteristic, where V is the magnitude (volts) of voltage applied to said armature, $\omega$ is the rotational speed (revolutions per minute) of the motor, and IARM is the magnitude (amperes) of the motor armature current, and in which said first means comprises (a1) means for calculating the quotient of a first value which is derived from the second feedback signal divided by another value which corresponds to motor speed, and (a2) means utilizing said known characteristic and said quotient for periodically finding the estimated desired value of current.

16. The feedback loss detecting means as in claim 15, in which said first value is proportional to the output voltage magnitude plus a predetermined constant if the polarity of said resultant value is negative, whereas it is proportional to the output voltage magnitude minus said predetermined constant if the polarity of said resultant value is positive.

17. The feedback loss detecting means of claim 1 for a traction vehicle propulsion system wherein the power supplying means comprises a-c generating means mechanically driven by a thermal prime mover and the electric load circuit comprises a plurality of traction motors.

* * * * *